(12) United States Patent
Meng

(10) Patent No.: US 10,833,862 B2
(45) Date of Patent: Nov. 10, 2020

(54) IDENTITY REGISTRATION METHOD AND DEVICE

(71) Applicant: Alibaba Group Holding Limited, George Town (KY)

(72) Inventor: Fei Meng, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 72 days.

(21) Appl. No.: 16/134,750

(22) Filed: Sep. 18, 2018

(65) Prior Publication Data

US 2019/0020483 A1 Jan. 17, 2019

Related U.S. Application Data

(63) Continuation of application No. PCT/CN2017/077247, filed on Mar. 20, 2017.

(30) Foreign Application Priority Data

Mar. 25, 2016 (CN) .......................... 2016 1 0180030

(51) Int. Cl.
*H04L 29/06* (2006.01)
*H04L 9/32* (2006.01)
*H04L 9/08* (2006.01)

(52) U.S. Cl.
CPC .......... *H04L 9/3231* (2013.01); *H04L 9/0866* (2013.01); *H04L 9/0897* (2013.01);
(Continued)

(58) Field of Classification Search
CPC .......... G06F 21/31; G06F 21/32; G06F 21/62; H04L 9/3231; H04L 9/0866;
(Continued)

(56) References Cited

U.S. PATENT DOCUMENTS

2002/0186838 A1   12/2002   Brandys
2004/0059924 A1   3/2004   Soto et al.
(Continued)

FOREIGN PATENT DOCUMENTS

CN   101340285   1/2009
CN   102523213   6/2012
(Continued)

OTHER PUBLICATIONS

International Search Report by the International Searching Authority issued in International Application No. PCT/CN2017/077247 dated May 27, 2017; 8 pages.
(Continued)

*Primary Examiner* — Malcolm Cribbs
(74) *Attorney, Agent, or Firm* — Fish & Richardson P.C.

(57) ABSTRACT

The present application provides identity registration and authorization methods using biometric feature information of user. In one example method, a terminal device receives biometric feature information of a user that is to be verified in association with a service processing request. The terminal device can then match the received biometric feature information to be verified with a pre-stored biometric feature of the user, where the pre-stored biometric feature of the user is associated with a corresponding identifier. In response to matching the received biometric feature information to be verified to a particular pre-stored biometric feature of the user, a private key store is searched for a private key associated with the identified of the particular pre-stored biometric feature of the user. In response to determining that no private is associated with the identifier, a user identity of the user is registered with a server.

15 Claims, 5 Drawing Sheets

(52) U.S. Cl.
CPC ........ *H04L 9/3247* (2013.01); *H04L 63/0823* (2013.01); *H04L 63/0861* (2013.01); *H04L 63/083* (2013.01)

(58) Field of Classification Search
CPC . H04L 9/0897; H04L 9/3247; H04L 63/0823; H04L 63/0861; H04L 63/083
See application file for complete search history.

(56) References Cited

U.S. PATENT DOCUMENTS

| | | | |
|---|---|---|---|
| 2009/0235068 A1 | 9/2009 | Song et al. | |
| 2009/0320125 A1* | 12/2009 | Pleasant, Jr. | G06F 21/31 726/17 |
| 2011/0142234 A1 | 6/2011 | Rogers | |
| 2012/0102317 A1* | 4/2012 | Mathur | G06F 21/10 713/156 |
| 2013/0212377 A1* | 8/2013 | Malek | H04L 9/3066 713/155 |
| 2014/0115340 A1* | 4/2014 | Lee | H04L 63/08 713/182 |
| 2014/0139318 A1 | 5/2014 | Malpani et al. | |
| 2014/0201536 A1 | 7/2014 | Fiske | |
| 2014/0223531 A1* | 8/2014 | Outwater | A61B 5/4824 726/7 |
| 2014/0354401 A1* | 12/2014 | Soni | G06F 21/32 340/5.52 |
| 2015/0046707 A1* | 2/2015 | Atherton | H04L 9/3231 713/168 |
| 2015/0061826 A1 | 3/2015 | Webber et al. | |
| 2015/0195278 A1* | 7/2015 | Plotkin | H04L 63/0861 713/186 |
| 2015/0312041 A1* | 10/2015 | Choi | H04L 9/3231 713/175 |
| 2017/0208464 A1 | 7/2017 | Guertler et al. | |

FOREIGN PATENT DOCUMENTS

| | | | |
|---|---|---|---|
| CN | 104253818 | 12/2014 | |
| CN | 104253818 A1 * | 12/2014 | ............ H04L 29/06 |
| CN | 104507086 | 4/2015 | |
| CN | 104540129 | 4/2015 | |
| CN | 105376233 | 3/2016 | |
| EP | 1175749 | 1/2002 | |
| KR | 20150044614 | 4/2015 | |
| RU | 2013150168 | 5/2015 | |
| WO | WO 2014141263 | 9/2014 | |

OTHER PUBLICATIONS

Extended European Search Report in European Application No. 17769389.2, dated Aug. 9, 2019, 9 pages.
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
PCT International Preliminary Report on Patentability in International Application No. PCT/CN2017/077247, dated Sep. 25, 2018, 10 pages (with English translation).

* cited by examiner

IDENTITY REGISTRATION METHOD AND DEVICE

CROSS-REFERENCE TO RELATED APPLICATIONS

This application is a continuation of PCT Application No. PCT/CN2017/077247, filed on Mar. 20, 2017, which claims priority to Chinese Patent Application No. 201610180030.4, filed on Mar. 25, 2016, and each application is hereby incorporated by reference in its entirety.

TECHNICAL FIELD

The present application relates to the field of computer technologies, and in particular, to an identity registration method and device.

BACKGROUND

With the continuous development of network technologies, using services through the network has become an integral part of people's life, for example, people use a weather forecast service through the network.

Currently, to improve information security when a user uses a service, the user needs to register a user identity in advance for the service before using the service. Later, when using the service through the network, the user identity needs to be verified. The user can use the service only after the verification succeeds. For example, if fingerprint information is used to represent the user identity, the fingerprint information of the user needs to be registered in advance.

Because fingerprint information recognition in actual applications is increasingly popular in terminal devices, for example, fingerprint information of a user is used to unlock a locked screen interface. For any service, a process in which a server of the service registers a user identity by using the fingerprint information of the user, and later verifies the user identity by using the fingerprint information of the user can be completed by using a terminal device.

Further, with the continuous improvement of the computer technologies, a plurality of fingerprint information of a user can be stored in a terminal device at the same time. For any service, when a user identity is registered by using the fingerprint information uploaded by the user, the terminal device first needs to verify whether the fingerprint information is one of the plurality of fingerprint information stored in the terminal device. If yes, the terminal device can register the user identity with a server based on the fingerprint information, and if no, the terminal device directly notifies the user that the identity registration fails.

In the existing technology, a process of registering fingerprint information of a user is shown in FIG. 1.

S101. A terminal device receives a registration operation of a user.

S102. Collect fingerprint information of the user.

S103. Determine whether the fingerprint information has been pre-stored in the terminal device, and if yes, perform S104, or otherwise, perform S105.

S104. Query an identifier corresponding to the pre-stored fingerprint information in the terminal device, generate a private key and a public key corresponding to the identifier, store a mapping relationship between the private key and the identifier corresponding to the fingerprint information in the terminal device, and send a mapping relationship between the public key and the identifier corresponding to the fingerprint information to a server for storage.

S105. Notify the user that registration fails.

Later, a process of a user using a service is shown in FIG. 2.

S201. A terminal device receives fingerprint information of a user.

S202. Match standard biometric feature information consistent with the fingerprint information.

S203. Search for a private key corresponding to an identifier based on the identifier corresponding to the standard biometric feature information.

S204. When the private key corresponding to the identifier is identified, sign service information by using the private key, and add the signed service information and the identifier corresponding to the fingerprint information to a service processing request and send the request to a server, so the server determines a public key corresponding to the identifier included in the received service processing request and performs service processing based on the public key and the service information. Alternatively, when the private key corresponding to the identifier is not identified, notify the user that the service processing fails.

However, in actual applications, if a user forgets which fingerprint is entered, the user needs to perform fingerprint verification for a plurality of times. It causes great inconvenience to the user to use a service, and reduces the success rate of using the service. In addition, if a user's finger used for registration is injured in daily life, the user cannot be authenticated to use the service.

SUMMARY

Implementations of the present application provide an identity registration method and device, to resolve existing-technology problems: a user forgets which fingerprint is entered and consequently it causes inconvenience to the user to use a service; and if a user's finger used for registration is injured in daily life, the user cannot be authenticated to use the service.

An implementation of the present application provides an identity registration method, and the method includes the following: receiving, by a terminal device, biometric feature information of a user that is to be verified; matching standard biometric feature information consistent with the biometric feature information to be verified in pre-stored biometric feature information; searching for a private key corresponding to an identifier based on the identifier corresponding to the standard biometric feature information after the matching succeeds; and registering a user identity with a server based on the biometric feature information to be verified when the private key corresponding to the identifier is not identified, so the server stores a public key corresponding to the biometric feature information to be verified.

An implementation of the present application provides an identity registration device, and the device includes the following: a receiving module, configured to receive biometric feature information of a user that is to be verified; a matching module, configured to match standard biometric feature information consistent with the biometric feature information to be verified in pre-stored biometric feature information; a search module, configured to search for a private key corresponding to an identifier based on the identifier corresponding to the standard biometric feature information after the matching succeeds; and a registration module, configured to register a user identity with a server based on the biometric feature information to be verified when the private key corresponding to the identifier is not identified, so the server stores a public key corresponding to the biometric feature information to be verified.

The implementations of the present application disclose an identity registration method and device. In the method, the terminal device receives the biometric feature information of the user that is to be verified, and matches the standard biometric feature information consistent with the biometric feature information to be verified. After the matching succeeds, the terminal device searches for the private key corresponding to the identifier based on the identifier corresponding to the standard biometric feature information, and registers the user identity with the server based on the biometric feature information to be verified when the private key corresponding to the identifier is not identified. As such, the server stores the public key corresponding to the biometric feature information to be verified. According to the previous method, regardless of biometric feature information used by the user for registration, provided that the terminal device can identify standard biometric feature information consistent with biometric feature information to be verified, even if a private key corresponding to an identifier is not identified in the terminal device based on the identifier corresponding to the standard biometric feature information, the terminal device can directly register the user identity based on the biometric feature information to be verified, to complete service processing, provide great convenience for the user to use a service, and also effectively improve the success rate of using the service.

BRIEF DESCRIPTION OF DRAWINGS

The accompanying drawings described here are intended to provide a further understanding of the present application, and constitute a part of the present application. The illustrative implementations of the present application and descriptions of the implementations are intended to describe the present application, and do not constitute limitations on the present application. In the accompanying drawings.

DESCRIPTION OF EMBODIMENTS

To make the objectives, technical solutions, and advantages of the present application clearer, the following describes the technical solutions of the present application with reference to specific implementations of the present application and corresponding accompanying drawings. Apparently, the described implementations are merely some rather than all of the implementations of the present application. Other implementations obtained by a person of ordinary skill in the art based on the implementations of the present application without creative efforts shall fall within the protection scope of the present application.

Figure 1:
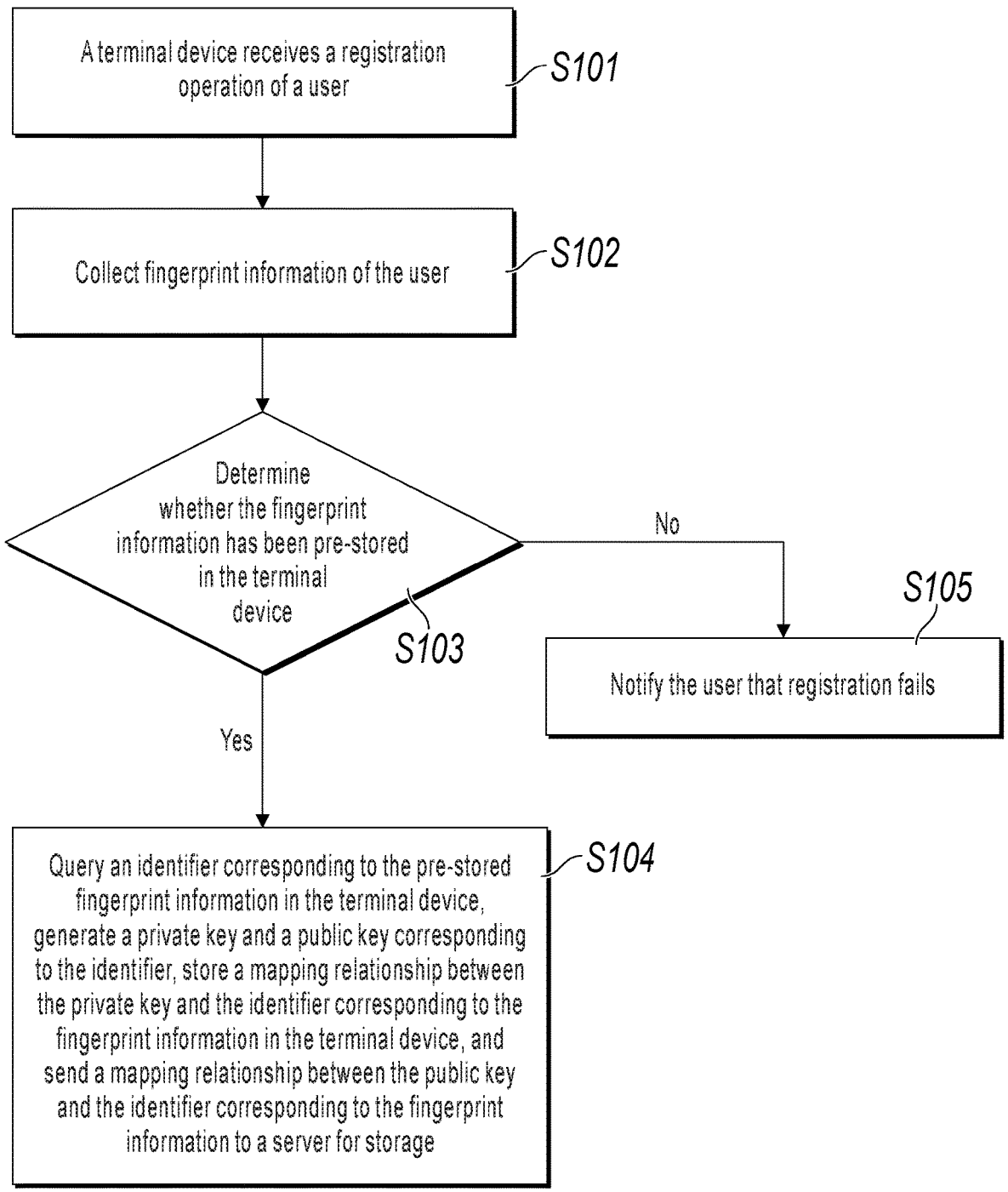
FIG. 1 is a schematic diagram illustrating a process of registering fingerprint information of a user in the existing technology, according to an implementation of the present application.
Figure 2:
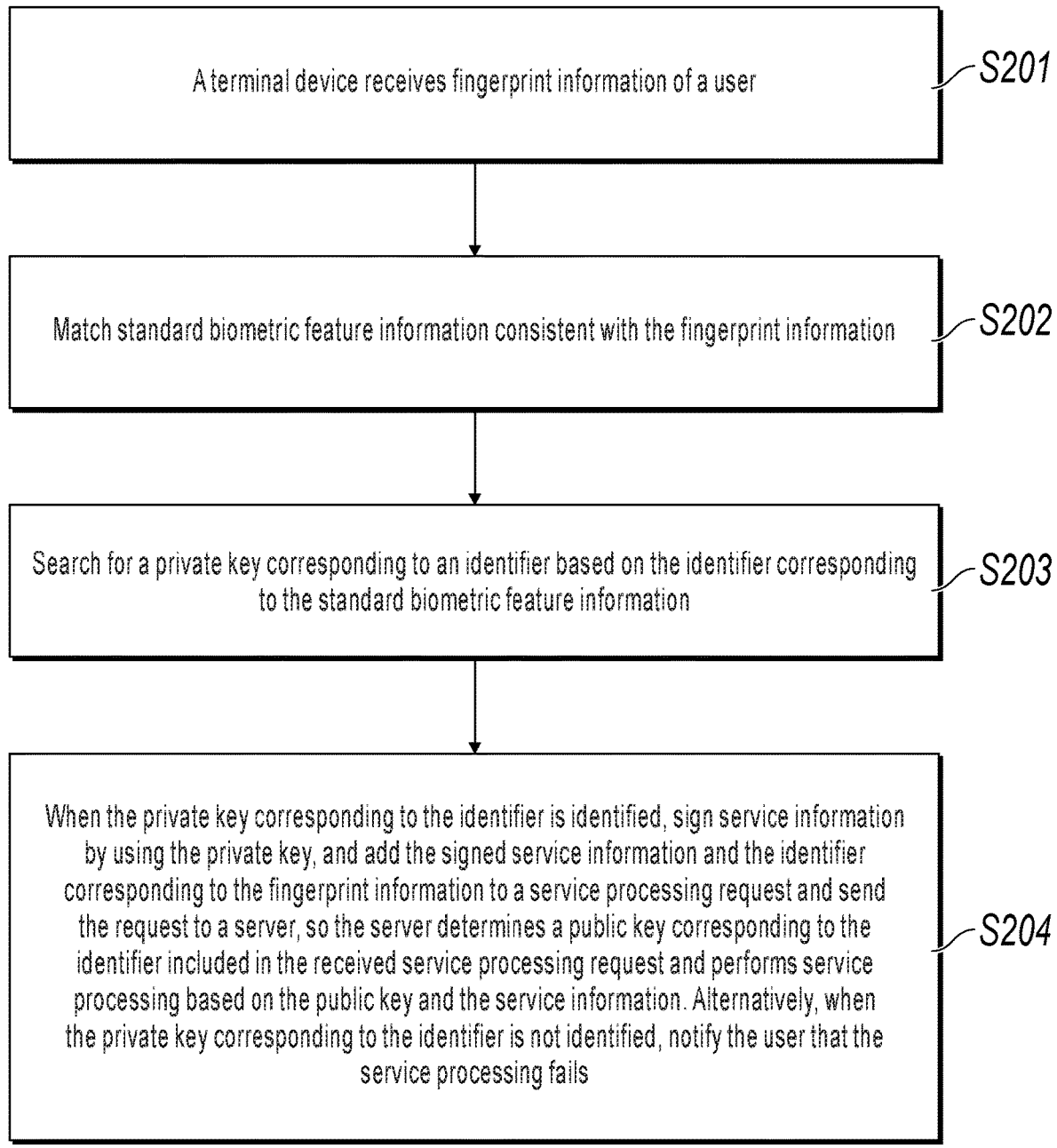
FIG. 2 is a schematic diagram illustrating a process of using a service by a user in the existing technology, according to an implementation of the present application.
Figure 3:
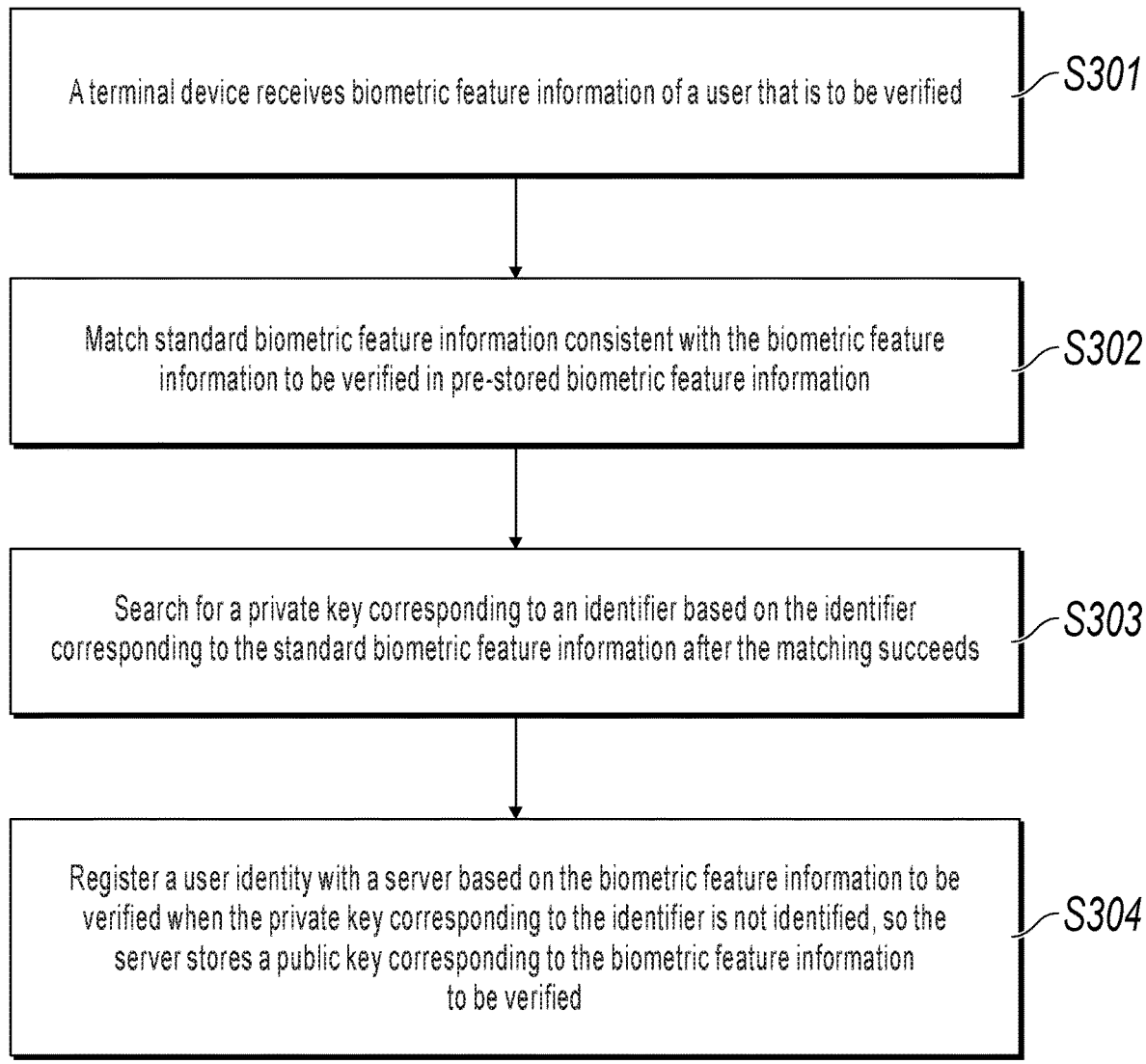
FIG. 3 is a schematic diagram illustrating an identity registration process, according to an implementation of the present application.

FIG. 3 shows an identity registration process, according to an implementation of the present application. The process includes the following steps.

S301. A terminal device receives biometric feature information of a user that is to be verified.

In actual applications, to improve information security when a user uses a service, in a process of using the service, an identity of the current user first needs to be verified to confirm that the identity of the current user is valid.

Therefore, in the present application, the biometric feature information of the user that is to be verified is first received. Because biometric feature information recognition is increasingly popular in terminal devices (for example, mobile phones) in actual applications, the biometric feature information of the user that is to be verified can be received by a terminal device. After receiving the biometric feature information, the terminal device makes a corresponding response. The biometric feature information indicates a physical sign of the user, and it can be an iris of an eye or a fingerprint of a finger, and is mainly used to uniquely represent a user identity.

In addition, in actual applications, for verifying the identity of the current user, fingerprint information verification is increasingly popular and the technology is relatively mature. Therefore, that the biometric feature information is fingerprint information is used as an example for detailed description below.

For example, assume that a certain forum provides an information query service only for a user who has registered an account, and the user can log in by using fingerprint information. Therefore, when the user needs to query information in the forum, the user opens an application corresponding to the forum on a mobile phone (that is, the terminal device) and presses with a fingerprint. Later, the mobile phone (that is, the terminal device) receives the fingerprint information of the user that is to be verified, and performs step S302.

S302. Match standard biometric feature information consistent with the biometric feature information to be verified in pre-stored biometric feature information.

Because fingerprint information (that is, biometric feature information) recognition in actual applications is increasingly popular in terminal devices, for example, fingerprint information of a user is used to unlock a locked screen interface. For any service, a process in which a server of the service registers a user identity by using the fingerprint information of the user, and later verifies the user identity by using the fingerprint information of the user can be completed by using fingerprint information that has been stored in a terminal device. In other words, provided that fingerprint information is stored in a terminal device, the fingerprint information can be used to complete the entire service processing in the present application.

It is worthwhile to note here that the fingerprint information stored in the terminal device can be entered by the user when the user uses another function of the terminal device, and is not the fingerprint information used by the user for identity registration for using a service. For example, when the user uses a function of the terminal device to unlock a locked screen interface by using the fingerprint information, the terminal device can locally store the fingerprint information.

In addition, in the present application, to distinguish between the stored fingerprint information and fingerprint information received by the terminal device when the user uses the service, the stored fingerprint information can be used as standard fingerprint information (that is, standard biometric feature information), and is mainly used to check whether the user can be authenticated in a process of using the service and to provide service processing for the user.

Therefore, in the present application, after receiving the fingerprint information (that is, the biometric feature information) of the user that is to be verified, the terminal device directly matches locally stored standard fingerprint information (that is, the standard biometric feature information) consistent with the fingerprint information to be verified.

Continuing with the earlier described example, after receiving the fingerprint information of the user that is to be verified, the mobile phone matches the locally stored standard fingerprint information consistent with the fingerprint information to be verified. Assume that the standard fingerprint information consistent with the fingerprint information to be verified is identified.

S303. Search for a private key corresponding to an identifier based on the identifier corresponding to the standard biometric feature information after the matching succeeds.

In the present application, to distinguish each piece of fingerprint information (that is, biometric feature information) that has been stored in the terminal device, the terminal device can allocate a fingerprint information identifier (that is, a biometric feature information identifier) to each piece of fingerprint information when storing the fingerprint information.

In addition, for verifying a user identity by a server corresponding to a future service, to be specific, the server corresponding to the service needs to know the user who uses the service. In the present application, a private key and a public key corresponding to an identifier need to be generated based on the identifier. The identifier is corresponding to fingerprint information used for registration. The private key and the public key represent a user identity. The generated private key is stored in the terminal device. When sending a service processing request to the server, the terminal device needs to use the private key to sign the service processing request, and sends the signed service processing request to the server.

Therefore, in the present application, after identifying the standard fingerprint information consistent with the fingerprint information to be verified, the terminal device needs to search for the private key corresponding to the identifier based on the identifier corresponding to the standard fingerprint information.

Continuing with the earlier described example, after identifying the standard fingerprint information consistent with the fingerprint information to be verified, the mobile phone searches for the private key corresponding to the identifier based on the identifier corresponding to the standard fingerprint information.

S304. Register a user identity with a server based on the biometric feature information to be verified when the private key corresponding to the identifier is not identified, so the server stores a public key corresponding to the biometric feature information to be verified.

In the present application, if the terminal device identifies the standard fingerprint information consistent with the fingerprint information to be verified in step S302, but the terminal device does not identify the private key corresponding to the identifier based on the identifier corresponding to the standard fingerprint information, it indicates that the fingerprint information to be verified belongs to the user, but is not the fingerprint information used during registration. To continue to provide the required service for the user, the user identity can be directly registered with the server based on the fingerprint information (that is, the biometric feature information) that is to be verified.

In addition, the present application provides a specific process of registering a user identity below:

The private key and the public key corresponding to the identifier are generated based on the identifier corresponding to the standard biometric feature information that matches the biometric feature information to be verified; a mapping relationship between the identifier and the generated private key is stored in the terminal device; and a mapping relationship between the identifier and the generated public key is sent to the server for storage.

It is worthwhile to note here that the standard biometric feature information uniquely corresponds to a standard biometric feature information identifier, and a standard biometric feature information identifier corresponds to a unique private key and public key. In other words, the standard biometric feature information and the standard biometric feature information identifier are in a one-to-one mapping relationship with a private key and a public key. In the present application, if the biometric feature information to be verified exists in the terminal device, in step S302, only one piece of standard biometric feature information can be identified. In other words, sending the mapping relationship between the identifier and the generated public key to the server for storage can also be storing, by the server, the public key corresponding to the biometric feature information to be verified.

Although the private key corresponding to the fingerprint information (that is, biometric feature information) is not found locally in the terminal device, the fingerprint information may not be fingerprint information of the user. To further improve information security when the user uses the service, in the present application, before the user identity is registered with the server based on the biometric feature information to be verified, the user can be prompted to enter a password for the service. When the password entered by the user is received, the terminal device verifies whether the password is correct. If the password is correct, the user identity can be registered with the server based on the biometric feature information to be verified. If the password is incorrect, the user identity is not registered with the server based on the biometric feature information to be verified, and the user is notified that service processing fails.

In addition, it is worthwhile to note here that when the terminal device does not identify the private key corresponding to the identifier, the terminal device can directly notify the user that service processing fails. In such case, the user can enter a password for the service to continue to use the service. The terminal device can receive the password entered by the user and verify whether the password is correct, and if yes, registers the user identity with the server based on the biometric feature information to be verified.

Continuing with the earlier described example, assume that the mobile phone has not identified the private key corresponding to the identifier. The mobile phone prompts the user to use a password for the information query service. Assume that the user enters the password xxxx. After receiving the password xxxx that is entered by the user, if the terminal device verifies that the password is correct, the terminal device generates the private key and the public key corresponding to the identifier, where the identifier is corresponding to the standard fingerprint information that matches the fingerprint information to be verified based on the identifier, stores a mapping relationship between the identifier and the generated private key in the mobile phone, and sends a mapping relationship between the identifier and the generated public key to the server for storage.

According to the previous method, regardless of biometric feature information used by the user for registration, provided that the terminal device can identify standard biometric feature information consistent with biometric feature information to be verified, even if a private key corresponding to an identifier is not identified in the terminal device based on the identifier corresponding to the standard biometric feature information, the terminal device can directly register the user identity based on the biometric feature information to be verified, to complete service processing, provide great convenience for the user to use a service, and also effectively improve the success rate of using the service.

Further, in actual applications, a service processing request can be sent to the server based on the biometric feature information to be verified after the user identity is registered with the server. As such, the server performs service processing based on the public key corresponding to the biometric feature information to be verified.

In step S304, the private key and the public key corresponding to the identifier of the fingerprint information (that is, the biometric feature information) have been re-generated based on the fingerprint information to be verified, and the public key is sent to the server for storage. Therefore, in a process of sending a service processing request to the server based on the fingerprint information to be verified, the present application can include the following: signing service information based on the generated private key and sending the service processing request that includes the signed service information and the identifier to the server, so the server determines the public key corresponding to the identifier included in the service processing request based on the identifier, verifies the signature of the service information included in the service processing request based on the determined public key to verify the user identity, and performs service processing on the service information.

Continuing with the earlier described example, the mobile phone signs login information based on the generated private key of the identifier, and sends a login processing request that includes the signed login information and the identifier to the server. The server identifies a public key corresponding to the identifier based on the identifier included in the login processing request, verifies the signature of the login information included in the login processing request by using the public key, and completes login of the user.

In actual applications, paying for purchased merchandise by using a payment application has become increasingly popular. In the present application, the following describes the present disclosure in detail by using an example in which a service processing request is a payment request.

For example, assume that user A has registered fingerprint information (that is, identity information) in a payment application. When user A pays for purchased merchandise by using the payment application, user A opens the payment application on the mobile phone (that is, the terminal device) and presses with a fingerprint. After receiving fingerprint information of the user that is to be verified, the mobile phone locally matches standard fingerprint information consistent with the fingerprint information to be verified. Assume that the standard fingerprint information consistent with the fingerprint information to be verified is identified. The mobile phone searches for a private key corresponding to an identifier based on the identifier corresponding to the standard fingerprint information. If the mobile phone does not identify the private key corresponding to the identifier, the mobile phone directly prompts the user to enter a payment password. The mobile phone receives the payment password cccc entered by the user and verifies whether the password is correct. If yes, the mobile phone generates the private key and a public key corresponding to an identifier, where the identifier is corresponding to the standard fingerprint information that matches the fingerprint information to be verified based on the identifier, stores a mapping relationship between the identifier and the generated private key in the mobile phone, and sends a mapping relationship between the identifier and the generated public key to the server for storage.

In a later process of processing a payment service, the mobile phone signs payment information based on the generated private key corresponding to the identifier and sends a payment processing request that includes the signed payment information and the identifier to the server. The server identifies the public key corresponding to the identifier based on the identifier included in the payment processing request, verifies the signature of the payment information by using the public key, and successfully completes payment.

Figure 4:
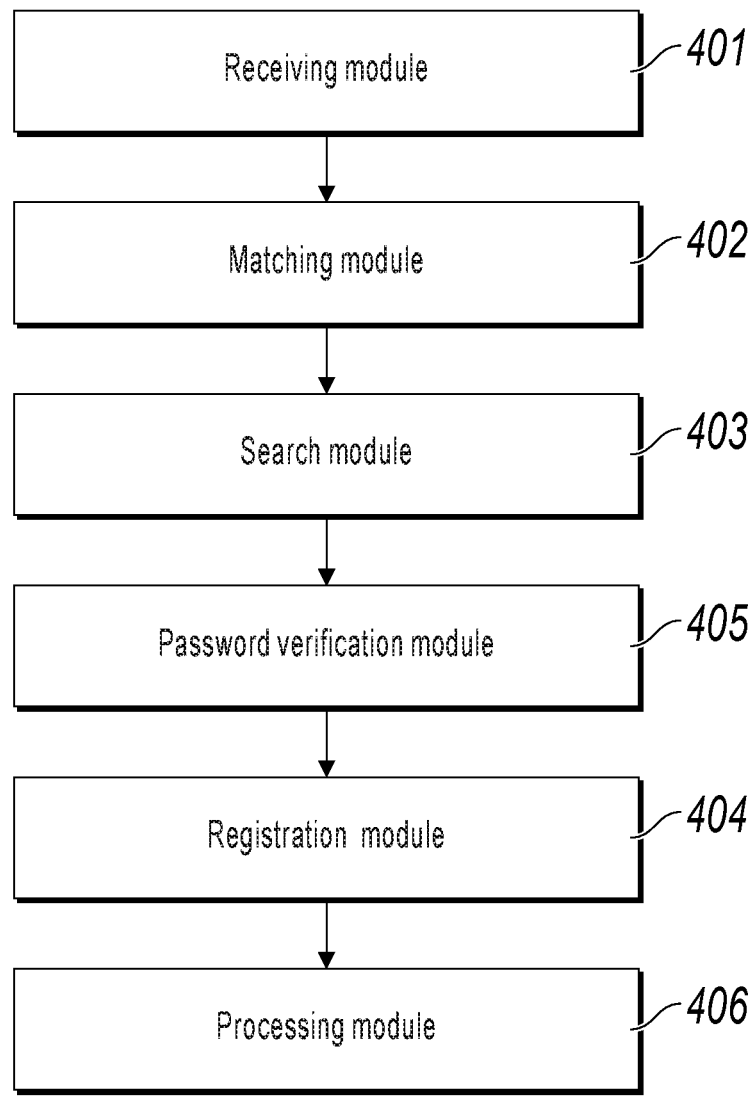
FIG. 4 is a schematic structural diagram illustrating an identity registration device, according to an implementation of the present application.

What is described above is the identity registration method provided in the implementation of the present application. As shown in FIG. 4, based on the same idea, the present application further provides a corresponding identity registration device.

FIG. 4 is a schematic structural diagram illustrating an identity registration device, according to an implementation of the present application. The device includes the following: a receiving module 401, configured to receive biometric feature information of a user that is to be verified; a matching module 402, configured to match standard biometric feature information consistent with the biometric feature information to be verified in pre-stored biometric feature information; a search module 403, configured to search for a private key corresponding to an identifier based on the identifier corresponding to the standard biometric feature information after the matching succeeds; and a registration module 404, configured to register a user identity with a server based on the biometric feature information to be verified when the search module 403 does not identify the private key corresponding to the identifier, so the server stores a public key corresponding to the biometric feature information to be verified.

The device further includes the following: a password verification module 405, configured to receive a password entered by the user and verify that the password is correct before the registration module 404 registers the user identity with the server based on the biometric feature information to be verified.

The registration module 404 is configured to generate the private key and the public key corresponding to the identifier based on the identifier corresponding to the standard biometric feature information that matches the biometric feature information to be verified; store a mapping relationship between the identifier and the generated private key in a terminal device; and send a mapping relationship between the identifier and the generated public key to the server for storage.

The device further includes the following: a processing module 406, configured to send a service processing request to the server based on the biometric feature information to be verified after the registration module 404 registers the user identity with the server, so the server performs service processing based on the public key corresponding to the biometric feature information to be verified.

The processing module 406 is configured to sign service information based on the generated private key and send the service processing request that includes the signed service information and the identifier to the server, so the server determines the public key corresponding to the identifier included in the received service processing request and performs service processing based on the determined public key and the signed service information.

The service processing request includes a payment request.

In typical configuration, a computing device includes one or more processors (CPU), an input/output interface, a network interface, and a memory.

The memory can include a non-persistent memory, a random access memory (RAM), and/or a nonvolatile memory, etc. in a computer readable medium, such as a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of a computer storage medium include but are not limited to a phase change random access memory (PRAM), a static RAM (SRAM), a dynamic RAM (DRAM), a RAM of another type, a read-only memory (ROM), an electrically erasable programmable read-only memory (EEPROM), a flash memory or another memory technology, a compact disc read-only memory (CD-ROM), a digital versatile disc (DVD) or another optical storage, a magnetic tape, a magnetic disk storage, another magnetic storage device, or any other non-transmission medium. The computer storage medium can be used to store information that can be accessed by a computing device. As described in the present specification, the computer readable medium does not include transitory media, for example, a modulated data signal and a carrier.

It is worthwhile to further note that, the term "include", "contain", or any other variant is intended to cover non-exclusive inclusion so that a process, a method, a product, or a device that includes a series of elements not only includes these elements, but also includes other elements that are not expressly listed, or further includes elements inherent to such a process, method, product, or device. An element preceded by "includes a . . . " does not, without more constraints, exclude the existence of additional identical elements in the process, method, product, or device that includes the element.

A person skilled in the art should understand that the implementations of the present application can be provided as a method, a system, or a computer program product. Therefore, the present application can use a form of hardware only implementations, software only implementations, or implementations with a combination of software and hardware. In addition, the present application can use a form of a computer program product implemented on one or more computer-usable storage media (including but not limited to a magnetic disk memory, a CD-ROM, and an optical memory) that include computer-usable program code.

The previous descriptions are merely implementations of the present application, and are not intended to limit the present application. A person skilled in the art can make various modifications and changes to the present application. Any modifications, equivalent replacements, improvements, etc. made within the spirit and principle of the present application shall fall within the protection scope of the claims of the present application.

Figure 5:
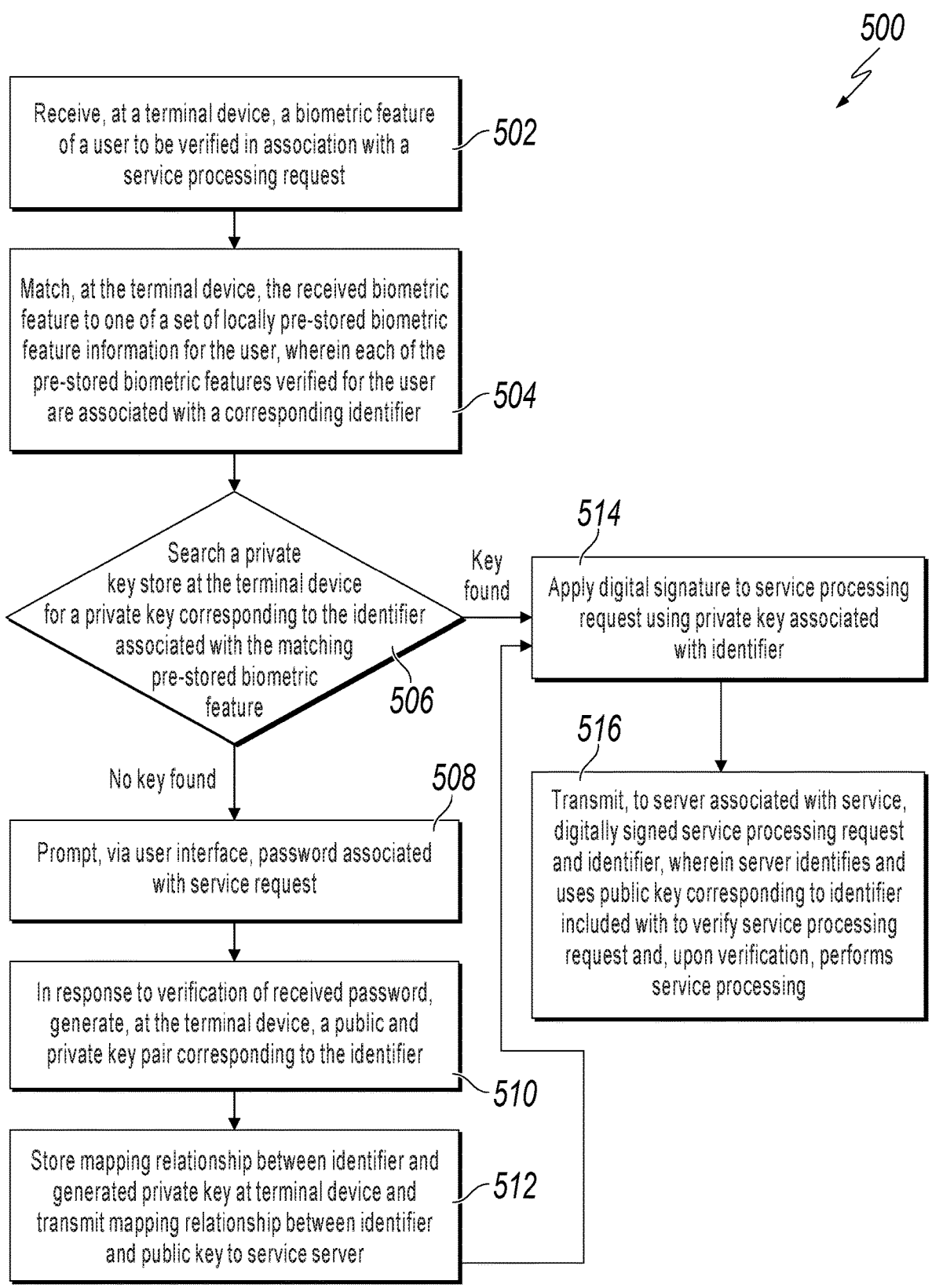
FIG. 5 is a flowchart illustrating an example of a computer-implemented method for performing an identity registration and authentication process for a service based on biometric information received at a terminal device, according to an implementation of the present disclosure.

FIG. 5 is a flowchart illustrating an example of a computer-implemented method 500 for performing an identity registration and authentication process for a service based on biometric information received at a terminal device, according to an implementation of the present disclosure. For clarity of presentation, the description that follows generally describes method 500 in the context of the other figures in this description. However, it will be understood that method 500 can be performed, for example, by any system, environment, software, and hardware, or a combination of systems, environments, software, and hardware, as appropriate. In some implementations, various steps of method 500 can be run in parallel, in combination, in loops, or in any order.

In general, method 500 relates to operations associated with allowing biometric features of a user to be used for service registration and service processing request authentication. Existing systems may allow a single fingerprint to be used for verification purposes. However, if a user injures that fingerprint, or forgets which fingerprint is to be used, the verification process will fail. In the current solution, any suitable biometric verification can be performed to verify a user for a particular service processing request, and can ensure that if a biometric feature of the user is received that is not currently used or associated with a particular service, that operations are taken that can, in some instances, allow the service to quickly and efficiently associate the newly received biometric feature with the backend service. The solution reduces friction in biometric registration processes, and allows users to use any suitable biometric feature registered on and associated with the device as a user verification basis for the service.

At 502, a biometric feature of a user to be verified in association with a service processing request for a particular service is received at a terminal device. In some instances, the biometric feature may be a fingerprint of the user from any suitable finger, an iris pattern or visualization, hand geometry, a retina scan, a voice, a gait of the user, or other suitable information. In some instances, the service processing request may be associated with a payment request, such as one associated with a mobile payment application executing on the terminal device. The terminal device may be a mobile device associated with and/or registered to the user. The service processing request may be associated with an executing application, a website request, or any other suitable service to be performed for the user, where, in the process of using the service, an identity of the current user needs to be verified prior to processing to confirm that the identity of the user associated with the request is valid.

At 504, the terminal device matches the received biometric feature to one of a set of locally pre-stored biometric feature information for the user. Because biometric feature information (such as, for example, fingerprint that is, biometric feature information) recognition in applications is increasingly popular in terminal devices, for example, biometric information of a user is used to unlock a locked screen interface. For any service, a process in which a server of the service registers a user identity by using the biometric information of the user, and later verifies the user identity by using the biometric information of the user can be completed by using biometric information that has been stored in a terminal device. In other words, provided that biometric information is stored in a terminal device, the biometric information can be used to complete the entire service processing herein.

In some instances, the biometric information stored in the terminal device can be entered by the user when the user uses another function of the terminal device, and is not the biometric information used by the user for identity registration for using a service. For example, when the user uses a function of the terminal device to unlock a locked screen interface by using the biometric information, the terminal device can locally store the biometric information.

In addition, to distinguish between the stored biometric information and biometric feature information received by the terminal device when the user uses the service, the stored biometric information can be used as standard biometric feature information, and is mainly used to check whether the user can be authenticated in a process of using the service and to provide service processing for the user.

Therefore, in the present application, after receiving the biometric feature information of the user that is to be verified in association with the service processing request, the terminal device can matches locally stored standard biometric information corresponding to the biometric feature information to be verified. In the present illustration, a match can be verified at the terminal device between the received biometric feature and at least one of the locally pre-stored biometric features. Further, each of the locally pre-stored biometric feature information associated with the user may be associated with a corresponding identifier. The identifier can be used by the terminal device to distinguish each piece of biometric feature information stored at the terminal device, and allows the terminal device to allocate a biometric information identifier to each piece of biometric feature information when it is initially stored.

At 506, a search is performed to determine whether a private key store at the terminal device includes a private key corresponding to the identifier associated with the matching pre-stored biometric feature information. The private key store can include one or more private keys that are mapped to particular identifiers. For verifying a user identify by a server corresponding to a future service, the server corresponding to the service needs to know and verify the user who uses the service. In the present application, a private key and a public key corresponding to a particular identifier need to be generated based on the identifier. The identifier corresponds to a particular biometric feature information and can be used for registration with the server. Further, the private key and the public key represent a user identity, where the generated private key is stored in the terminal device, and the generated public key can be transmitted to the server for use in verifying service processing requests signed by the generated private key.

Therefore, after identifying the standard biometric feature information consistent with the received biometric feature information to be verified, the terminal device performs a search for the private key corresponding to the identifier, where the identifier corresponds to the standard biometric feature information.

If it is determined that a private key associated with the identifier is found, then method 500 can proceed to 514 based on a previous registration with the service. Otherwise, if it is determined that no private keys in the private key store correspond to the identifier, then method 500 proceeds to 508.

At 508, based on the determination that no private keys associated with the identifier, and thus, a prior registration with the server associated with the service processing request, are found, the terminal device can prompt the user, via a user interface of the terminal device, for a password associated with the service request. Based on the fact that the received biometric feature information matches a pre-stored biometric information, the received biometric feature information is verified as belonging to the user, but indicates that the biometric information was not used during a registration process with the service and its server, if the registration service has even already been performed. To continue to provide the requested service for the user, the user identity of the user can be directly registered with the server based on the biometric feature information that is to be verified. Therefore, before the user identity is registered with the server based on the biometric feature information to be verified, the terminal device can determine whether the received password associated with the service request is correct. If the received password from 508 is correct, then method 500 can continue to 510.

In response to verification of the received password, further operations to register the user identity with the server can be performed, including, at 510, the generation of a public and private key pair at the terminal device corresponding to the identifier of the pre-stored biometric information, wherein the identifier corresponds to the standard biometric feature information that matches the received biometric feature information of 502.

Continuing at 512, a mapping relationship between the identifier and the newly generate private key can be defined and stored at the terminal device. Further, a mapping relationship between the identifier and the generated public key, as well as the generated public key itself, can be transmitted to the server associated with the service for storage. By generating the private and public key pair and providing the mapping information to the server associated with the service, the user identity of the user is registered based on the received biometric feature information to be verified. Once registered, method 500 can continue at 514, which may also be reached after the determination of 506 where an existing private key is found after the private key store search.

At 514, a digital signature is applied to the service processing request using the private key associated with the identifier, either as found after 506, or as generated in 510 and associated with the identifier at 512. The digital signature can be applied using any suitable digital signature method or procedure. A digital signature is a mathematical scheme for presenting the authenticity of a digital message or document, and can be used by the server associated with the service to confirm that the corresponding service processing request was received from the registered user.

At 516, the digitally signed service processing request and the corresponding identifier associated with the received biometric feature information is transmitted to the server associated with the service. Using the previously received mapping relationship information provided to the server at 512, the server can identify the corresponding public key mapped to the transmitted identifier. Using that public key, the server can validate the digital signature to verify that the service processing request was received from the user. Upon verification, the server can then perform service processing corresponding to the service processing request for the verified and registered user. In some instances, the terminal device may receive a confirmation that the service processing associated with the service request was successfully performed.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

The invention claimed is:

1. A computer-implemented method, comprising:
receiving, by a terminal device, biometric feature information of a user that is to be verified in association with a service processing request;
matching, by the terminal device, the received biometric feature information to be verified with a particular pre-stored biometric feature of the user, wherein the particular pre-stored biometric feature of the user is stored at the terminal device, and wherein the particular pre-stored biometric feature of the user is associated with a corresponding identifier;
in response to matching the received biometric feature information to be verified to a particular pre-stored biometric feature of the user, searching a private key store for a private key associated with the identifier of the particular pre-stored biometric feature of the user;
in response to determining that no private key in the private key store is associated with the identifier of the particular pre-stored biometric feature of the user, registering a user identity of the user with a server at which the service processing request is to be sent, wherein registering the user identity of the user with the server at which the service processing request is to be sent comprises:
generating a private key and a public key corresponding to the identifier of the Particular pre-stored biometric feature of the user;
storing a mapping relationship between the identifier and the generated private key in the terminal device; and
transmitting a mapping relationship between the identifier and the generated public key to the server for storage; and
sending, after the registering, the service processing request and the identifier of the particular pre-stored biometric feature of the user to the server, wherein the terminal device signs the service processing request with a digital signature using the generated private key associated with the identifier of the particular pre-stored biometric feature of the user, and wherein the server performs the service processing associated with the service processing request after verifying the digital signature of the terminal device using the generated public key corresponding to the identifier of the particular pre-stored biometric feature of the user.

2. The computer-implemented method of claim 1, wherein, before registering the user identity with the server at which the service processing request is to be sent, the method further comprises:
prompting the user, at the terminal device, for a password to be entered by the user, the password associated with the service request;
in response to receiving the password, verifying that the password is valid; and
allowing registration of the user identity with the server at which the service processing request is to be sent.

3. The computer-implemented method of claim 1, the method further comprising:
in response to determining that a private key in the private key store is associated with the identifier of the particular pre-stored biometric feature of the user, determining that the user identity of the user is already registered at the server, wherein the determined private key corresponds to a public key stored at the server and associated with the identifier of the particular pre-stored biometric feature of the user.

4. The computer-implemented method of claim 3, the method further comprising:
sending the service processing request and the identifier of the particular pre-stored biometric feature of the user to the server, wherein the terminal device signs the service processing request with a digital signature using the determined private key associated with the identifier of the particular pre-stored biometric feature of the user, and wherein the server performs the service processing associated with the service processing request after verifying the digital signature of the terminal device using the public key corresponding to the identifier of the particular pre-stored biometric feature of the user.

5. The computer-implemented method of claim 1, wherein the service processing request comprises a payment request.

6. The computer-implemented method of claim 1, wherein the received biometric feature information of the user that is to be verified comprises a fingerprint.

7. The computer-implemented method of claim 1, wherein the pre-stored biometric feature of the user is one of a plurality of pre-stored biometric features of the user stored at the terminal device, wherein the plurality of pre-stored biometric features of the user include a plurality of different biometric feature information of the user, including at least one of a stored fingerprint, an iris pattern or visualization, a hand geometry, a retina scan, or a voice pattern.

8. A non-transitory, computer-readable medium storing one or more instructions executable by a computer system to perform operations comprising:
receiving, by a terminal device, biometric feature information of a user that is to be verified in association with a service processing request;
matching, by the terminal device, the received biometric feature information to be verified with a particular pre-stored biometric feature of the user, wherein the particular pre-stored biometric feature of the user is stored at the terminal device, and wherein the particular pre-stored biometric feature of the user is associated with a corresponding identifier;
in response to matching the received biometric feature information to be verified to a particular pre-stored biometric feature of the user, searching a private key store for a private key associated with the identifier of the particular pre-stored biometric feature of the user; and
in response to determining that no private key in the private key store is associated with the identifier of the particular pre-stored biometric feature of the user, registering a user identity of the user with a server at which the service processing request is to be sent, wherein registering the user identity of the user with the server at which the service processing request is to be sent comprises:

generating a private key and a public key corresponding to the identifier of the particular pre-stored biometric feature of the user;

storing a mapping relationship between the identifier and the generated private key in the terminal device; and transmitting a mapping relationship between the identifier and the generated public key to the server for storage; and sending, after the registering, the service processing request and the identifier of the particular pre-stored biometric feature of the user to the server, wherein the terminal device signs the service processing request with a digital signature using the generated private key associated with the identifier of the particular pre-stored biometric feature of the user, and wherein the server performs the service processing associated with the service processing request after verifying the digital signature of the terminal device using the generated public key corresponding to the identifier of the particular pre-stored biometric feature of the user.

9. The non-transitory, computer-readable medium of claim 8, wherein, before registering the user identity with the server at which the service processing request is to be sent, the operations further comprising:

prompting the user, at the terminal device, for a password to be entered by the user, the password associated with the service request;

in response to receiving the password, verifying that the password is valid; and allowing registration of the user identity with the server at which the service processing request is to be sent.

10. The non-transitory, computer-readable medium of claim 8, the operations further comprising:

in response to determining that a private key in the private key store is associated with the identifier of the particular pre-stored biometric feature of the user, determining that the user identity of the user is already registered at the server, wherein the determined private key corresponds to a public key stored at the server and associated with the identifier of the particular pre-stored biometric feature of the user.

11. The non-transitory, computer-readable medium of claim 10, the operations further comprising:

sending the service processing request and the identifier of the particular pre-stored biometric feature of the user to the server, wherein the terminal device signs the service processing request with a digital signature using the determined private key associated with the identifier of the particular pre-stored biometric feature of the user, and wherein the server performs the service processing associated with the service processing request after verifying the digital signature of the terminal device using the public key corresponding to the identifier of the particular pre-stored biometric feature of the user.

12. The non-transitory, computer-readable medium of claim 8, wherein the service processing request comprises a payment request.

13. The non-transitory, computer-readable medium of claim 8, wherein the received biometric feature information of the user that is to be verified comprises a fingerprint.

14. The non-transitory, computer-readable medium of claim 8, wherein the pre-stored biometric feature of the user is one of a plurality of pre-stored biometric features of the user stored at the terminal device, wherein the plurality of pre-stored biometric features of the user include a plurality of different biometric feature information of the user, including at least one of a stored fingerprint, an iris pattern or visualization, a hand geometry, a retina scan, or a voice pattern.

15. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

receiving, by a terminal device, biometric feature information of a user that is to be verified in association with a service processing request;

matching, by the terminal device, the received biometric feature information to be verified with a particular pre-stored biometric feature of the user, wherein the particular pre-stored biometric feature of the user is stored at the terminal device, and wherein the particular pre-stored biometric feature of the user is associated with a corresponding identifier;

in response to matching the received biometric feature information to be verified to a particular pre-stored biometric feature of the user, searching a private key store for a private key associated with the identifier of the particular pre-stored biometric feature of the user; and in response to determining that no private key in the private key store is associated with the identifier of the particular pre-stored biometric feature of the user, registering a user identity of the user with a server at which the service processing request is to be sent wherein registering the user identity of the user with the server at which the service processing request is to be sent comprises:

generating a private key and a public key corresponding to the identifier of the particular pre-stored biometric feature of the user;

storing a mapping relationship between the identifier and the generated private key in the terminal device; and transmitting a mapping relationship between the identifier and the generated public key to the server for storage; and sending, after the registering, the service processing request and the identifier of the particular pre-stored biometric feature of the user to the server, wherein the terminal device signs the service processing request with a digital signature using the generated private key associated with the identifier of the particular pre-stored biometric feature of the user, and wherein the server performs the service processing associated with the service processing request after verifying the digital signature of the terminal device using the generated public key corresponding to the identifier of the particular pre-stored biometric feature of the user.

* * * * *